(12) United States Patent
Mounsef et al.

(10) Patent No.: US 6,754,749 B1
(45) Date of Patent: Jun. 22, 2004

(54) MULTIPLE USE INTEGRATED CIRCUIT FOR EMBEDDED SYSTEMS

(75) Inventors: Elias Mounsef, Citrus Heights, CA (US); Raymond Chow, Folsom, CA (US)

(73) Assignee: ShareWave, Inc., Austin, TX (US)

( * ) Notice: Subject to any disclaimer, the term of this patent is extended or adjusted under 35 U.S.C. 154(b) by 0 days.

(21) Appl. No.: 09/811,293

(22) Filed: Mar. 15, 2001

Related U.S. Application Data

(60) Provisional application No. 60/263,613, filed on Jan. 22, 2001.

(51) Int. Cl.[7] .......................... G06F 13/00; G06F 15/16
(52) U.S. Cl. ....................... 710/100; 710/104; 710/107; 709/229
(58) Field of Search ................................ 710/129, 100, 710/107, 104; 709/229; 711/1

(56) References Cited

U.S. PATENT DOCUMENTS

| | | | | |
|---|---|---|---|---|
| 5,687,325 A | * | 11/1997 | Chang ........................ | 710/104 |
| 5,826,048 A | * | 10/1998 | Dempsey et al. ............ | 710/306 |
| 5,867,717 A | * | 2/1999 | Milhaupt et al. ........... | 713/323 |
| 5,884,027 A | * | 3/1999 | Garbus et al. .............. | 709/250 |
| 5,954,813 A | * | 9/1999 | Mann et al. ................. | 712/43 |
| 5,966,667 A | * | 10/1999 | Halloran et al. ......... | 455/552.1 |
| 5,970,069 A | * | 10/1999 | Kumar et al. .............. | 370/402 |
| 6,247,088 B1 | * | 6/2001 | Seo et al. ................... | 710/129 |
| 6,266,731 B1 | * | 7/2001 | Riley et al. ................ | 710/129 |

OTHER PUBLICATIONS

Data Sheet Publication entitled "IDT Interprise Integrated Communication Processor–79Rc32332–Rev. Y" copyrights 2002 by Integrated Device Technology, Inc. dates Sep. 18, 2002, pp. 1–28.

* cited by examiner

*Primary Examiner*—Frantz B. Jean
(74) *Attorney, Agent, or Firm*—Winstead Sechrest & Minick P.C.; James J. Murphy

(57) ABSTRACT

An integrated circuit includes a microcontroller core interconnected with a peripheral component interconnect (PCI) interface configurable as a PCI host/CPU bridge when the integrated circuit is used in embedded system applications and as a PCI device when the integrated circuit is used in a hosted application. In some cases, a radio media access controller is (MAC) interconnected to the microcontroller. Also, a forward error correction (FEC) coder/decoder (CODEC) coupled to the radio MAC may be provided. Such an FEC CODEC may be configured to provide Reed-Solomon coding/decoding. Preferably, one or more communication interfaces coupled to the microcontroller are provided, each being configured to allow for interconnection of the integrated circuit with external communication channels.

18 Claims, 2 Drawing Sheets

MULTIPLE USE INTEGRATED CIRCUIT FOR EMBEDDED SYSTEMS

This application claims priority to United States Provisional Patent Application Ser. No. 60/463,858, filed Jan. 22, 2001.

FIELD OF THE INVENTION

The present invention is directed to a multiple-use integrated circuit which can be used in a variety of applications, including wireless network applications, as both a peripheral component interconnect (PCI) master/target interface in conventional or embedded systems.

BACKGROUND

Many computer systems utilize the well known PCI bus as an interconnect for various devices in computer systems. Some devices are capable of operating as both PCI bus masters and PCI bus targets; however, these devices do not allow for interconnection to other types of communication channels, nor can these devices serve as bridges to other networks/interconnects. Accordingly, a deficiency exists in this area.

SUMMARY OF THE INVENTION

An integrated circuit includes a microcontroller core interconnected with a peripheral component interconnect (PCI) interface configurable as a PCI HOST/CPU supporting multiple PCI devices when the integrated circuit is used in embedded system applications and as a PCI device when the integrated circuit is used in a hosted application. In some cases, a radio media access controller is (MAC) interconnected to the microcontroller. Also, a forward error correction (FEC) coder/decoder (CODEC) coupled to the radio MAC may be provided. Such an FEC CODEC may be configured to provide Reed-Solomon coding/decoding. Preferably, one or more communication interfaces coupled to the microcontroller are provided, each being configured to allow for interconnection of the integrated circuit with external communication channels.

BRIEF DESCRIPTION OF THE DRAWINGS

The present invention is illustrated by way of example, and not limitation, in the figures of the accompanying drawings in which.

DETAILED DESCRIPTION

A multi-use integrated circuit is described herein. Some embodiments of the present invention are described with particular reference to the drawings; however, these descriptions are provided for clarifying certain details of the present invention and are not meant to be limiting in scope. Upon review of this specification, those of ordinary skill in the art will recognize that the present integrated circuit may find application in a variety of environments and, therefore, the following description should be regarded as illustrative only and should not be deemed to limit the scope of the present inventions.

Figure 1:
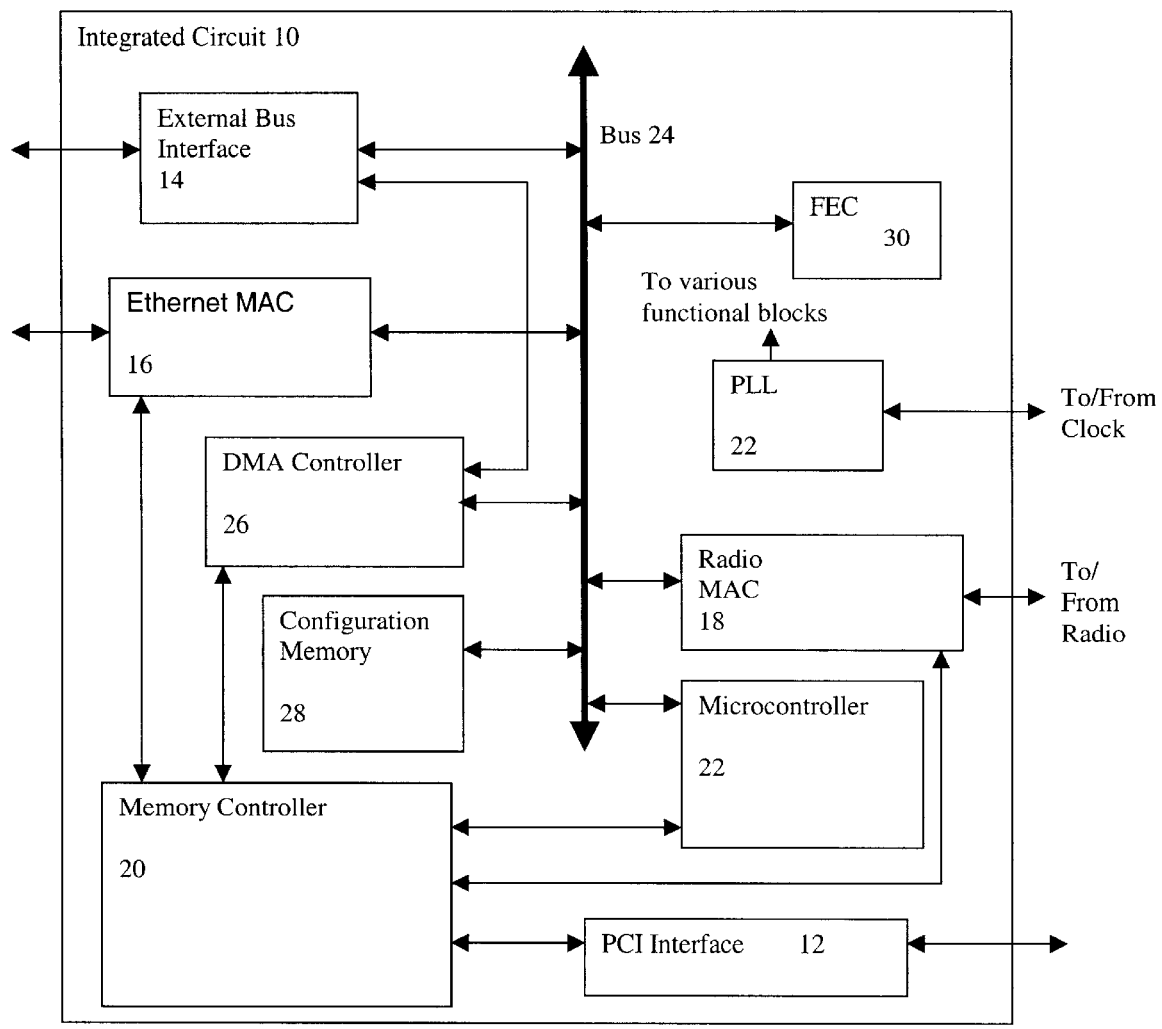
FIG. 1 illustrates one embodiment of an integrated circuit configured in accordance with the present invention.

FIG. 1 illustrates one example of an integrated circuit 10 configured in accordance with the present invention. Integrated circuit 10 may be fabricated in accordance with conventional semiconductor processing techniques and is a versatile system and network controller that can be used in a variety of applications, for example, home networking applications such as bridging home wireless and/or wired networks. Integrated circuit 10 includes multiple network interfaces as well as interfaces for a variety of communicated busses. In particular, integrated circuit 10 includes peripheral component interconnect (PCI) interface 12, which allows integrated circuit 10 to serve as a PCI compliant master or target interface. By further including additional communication interconnects, integrated circuit 10 enables applications such as a stand-alone residential gateway, a residential bridge, or an embedded dual mode network controller.

In addition to PCI interface 12, integrated circuit 10 includes external bus interface 14. This external bus interface may be any of a variety of interfaces, such as a universal serial bus (USB) interface, an Ethernet/HPNA interface, or some other external bus. In other cases, external bus interface 14 may serve to extend the internal processor control bus (part of bus 24) outside integrated circuit 10. Also included in integrated circuit 10 is Ethernet medium access controller (MAC) 16. Ethernet MAC 16 allows for interconnection with the familiar Ethernet communication bus. Further, integrated circuit 10 includes radio MAC 18, which allows for interconnection with a digital radio transceiver. Thus, integrated circuit 10 can serve as a bridge between wired and wireless communication networks.

The PCI interface 12, external bus interface 14, Ethernet MAC 16 and radio MAC 18 may each include direct memory access (DMA) controllers which allow for direct communication with a memory controller 20. In this way, each of these communication interfaces can exchange data with an external memory through memory controller 20 without having to burden a central microcontroller 22. In other embodiments, each of these data exchanges may occur across bus 24 under the control of microcontroller 22 and/or DMA controller 26. Note that for the illustrated embodiment, external bus interface 14 is shown communicating with memory controller 20 via DMA controller 26, thus indicating that the external bus interface 14 need not include its own DMA controller.

Microcontroller 22 acts as the core of integrated circuit 10 and may be configured to support a full real-time, multitasking operating system or other operating system. Various functions to be performed by microcontroller 10 may be programmed through the use of configuration memory 28. That is, configuration data to control the actions of microcontroller 22 (and, by extension, integrated circuit 10), may be pre-stored in configuration memory 28. In one embodiment, microcontroller 22 may be based on the familiar ARM microcontroller core.

Instructions and/or data for micro controller 22 may be fetched from external memory through memory controller 20. In some cases, these instructions and/or data may be stored in an on-board cache associated with microcontroller 22 (not shown). Further, an associated interrupt controller (also not shown) may be used to handle interrupts from other functional blocks of integrated circuit 10 during operations of those functional blocks.

Radio MAC 18 has a number of interfaces, including a transmit/receive interface through which it communicates with an external radio as discussed above. In addition, interfaces are provided to memory controller 20 and bus 24 to allow for the exchange of data with external memory and other functional blocks of integrated circuit 10, respectively.

Also included in integrated circuit 10 is a forward error correction (FEC) coder/decoder (CODEC). FEC CODEC 30 may be used to perform Reed-Solomon coding to protect data before it is transmitted across a noisy communication channel (e.g., a wireless communication channel). The use of such coding can help reduce error probability in transmissions. During reception, FEC CODEC 30 may be used to decode received data. To allow for maximum flexibility, FEC CODEC 30 will be configured to allow coding parameters to be set in real-time, allowing for on-the-fly adjustments of parameters such as block size in order to optimize channel efficiency. Such coding parameters may be stored in configuration memory 28 or may be accessed through memory controller 20 when stored in an external memory.

To allow for proper coordination of operations in integrated circuit 10, a phase lock loop (PLL) 32 is provided. Such PLLs are well known in the art and need not be described further herein. In operation, an external clock signal would be provided to PLL block 32, as is familiar in the art.

As indicated above, PCI interface 12 may be used to permit integrated circuit 10 to operate as a component of a host computer system or may be used to allow integrated circuit 10 to operate as the controller of an embedded system. In either case, PCI interface 12 may be used to facilitate the transfer of wireless and/or multi media data to/from integrated circuit 10. In one embodiment, embedded in PCI interface 12 is a fully compliant master/target 32 byte data interface including power management support. An internal communication buffer may use a mailbox mechanism to allow for communications between PCI interface 12 and microcontroller 22. In such a scheme, PCI interface 12 may write data into its communication buffer, which then writes to the PCI mailbox in memory, causing an interrupt to be generated to micro controller 22. In response, micro controller 22 may read data from the communication buffer and then read the PCI mailbox, causing an interrupt be generated to PCI interface 12. Of course, other communication schemes can also be used.

Figure 2:
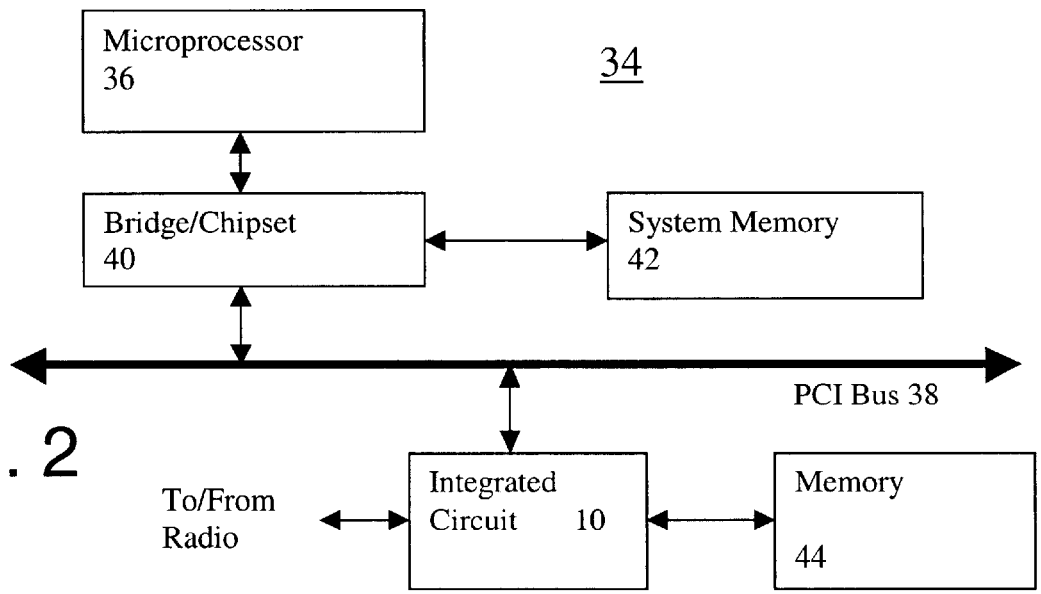
FIG. 2 illustrates one example of the use of an integrated circuit configured in accordance with the present invention in a conventional computer system application.

FIG. 2 illustrates an example of a computer system 34 that includes integrated circuit 10 as a component thereof. Computer system 34 has at its heart microprocessor 36, which is coupled to PCI bus 38 via bridge 40. Computer system 34 also includes system memory 42, in the conventional fashion. Integrated circuit 10 is also coupled to PCI bus 38 and has its associated memory 44, which is coupled to memory controller 20. Thus, integrated circuit 10 operates as a familiar PCI bus device in this configuration, and may also act as a bridge to/from a wireless network, thanks to radio MAC 18.

Figure 3:
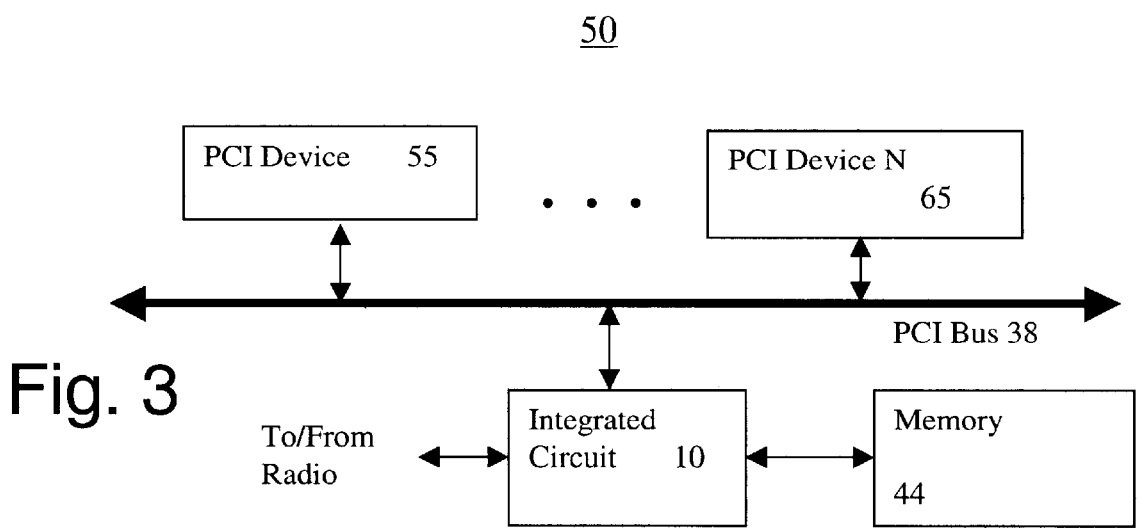
FIG. 3 illustrates one example of the use of an integrated circuit configured in accordance with the present invention in an embedded system application.

FIG. 3 illustrates an alternative use for integrated circuit 10, this time as part of an embedded system. In this example, integrated circuit 10 forms the central controller of an embedded system 50, such as a residential gateway. In this example, a number of PCI devices 55 are interconnected with integrated circuit 10 across a PCI bus 38 as shown. The PCI devices 55 may be any conventional PCI device, such as a network bridge, an I/O device such as a floppy disk controller, a CD ROM, a serial port interface, a parallel port interface, a DVD-ROM, a modem, or other PCI based device. Thus, integrated circuit 10 is capable of behaving as either a PCI host/CPU bridge on a PCI bus or, as is the case in the FIG. 2 embodiment, a PCI device (master/target). The overall functioning of integrated circuit 10 may be controlled by firmware stored in configuration memory 28. Thus, a multi-use integrated circuit has been described.

What is claimed is:

1. An integrated circuit comprising:

a configuration memory;

a peripheral component interconnect (PCI) interface;

an external bus interface; and a general purpose, programmable, microcontroller core interconnected with the PCI interface, the external bus interface, and the configuration memory;

wherein the integrated circuit is configurable to operate as either a microcontroller and PCI host or as a PCI target device, responsive to a state of the configuration memory.

2. The integrated circuit of claim 1 further comprising a radio media access controller (MAC) interconnected to the microcontroller.

3. The integrated circuit of claim 2 further comprising a forward error correction (FEC) coder/decoder (CODEC) coupled to the radio MAC.

4. The integrated circuit of claim 3 wherein the FEC CODEC is configured to provide Reed-Solomon coding/decoding.

5. The integrated circuit of claim 1 further comprising one or more communication interfaces coupled to the microcontroller and each being configured to allow for interconnection of the integrated circuit with external communication channels.

6. The integrated circuit of claim 5 further comprising a DMA controller coupled to the PCI interface, the external bus interface, the microcontroller, and the one or more communication interfaces.

7. The integrated circuit of claim 6 wherein the DMA controller provides data transfers between the PCI interface, the external bus interface, and the one or more communication interfaces.

8. The integrated circuit of claim 1 wherein the external bus interface comprises one of an universal serial bus interface (USB), an Ethernet interface, or an HPNA interface.

9. The integrated circuit of claim 1 wherein the external bus interface comprises an extension of a control bus of the microcontroller.

10. The integrated circuit of claim 1 further comprising a DMA controller coupled to the PCI interface, the external bus interface, and the microcontroller.

11. An integrated microcontroller comprising:

a communication circuit;

a PCI interface;

an external bus interface; and a general purpose processor, wherein the microcontroller is configurable to operate in a first mode as a PCI target device, or in a second mode as a standalone processor and PCI host device.

12. The microcontroller of claim 11 wherein the communication circuit comprises a network interface.

13. The microcontroller of claim 11 wherein the network interface comprises an interface for a wireless network.

14. The microcontroller of claim 11 wherein the external bus interface comprises one of an universal serial bus interface (USB), an Ethernet interface, or an HPNA interface.

15. The microcontroller of claim 11 wherein the external bus interface comprises an extension of a control bus of the processor.

16. The integrated circuit of claim 11 further comprising a DMA controller coupled to the PCI interface, the external bus interface, and the microcontroller.

17. The integrated circuit of claim 11 further comprising a DMA controller coupled to the PCI interface, the external bus interface, the microcontroller, and the communication circuit.

18. The integrated circuit of claim 17 wherein the DMA controller provides data transfers between the PCI interface, the external bus interface, and the communication circuit.

* * * * *